(12) United States Patent
Bahn et al.

(10) Patent No.: US 9,998,546 B2
(45) Date of Patent: *Jun. 12, 2018

(54) METHOD AND APPARATUS FOR COMMUNICATION CONNECTION SERVICE

(71) Applicant: Samsung Electronics Co., Ltd., Gyeonggi-do (KR)

(72) Inventors: Sahnghee Bahn, Gyeonggi-do (KR); Sungsoo Hong, Seoul (KR); Changhwan Hwang, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/973,122

(22) Filed: Dec. 17, 2015

(65) Prior Publication Data

US 2016/0105514 A1 Apr. 14, 2016

Related U.S. Application Data

(63) Continuation of application No. 13/603,982, filed on Sep. 5, 2012, now Pat. No. 9,241,246.

(30) Foreign Application Priority Data

Sep. 29, 2011 (KR) .......................... 10-2011-0098792

(51) Int. Cl.
*G06F 15/16* (2006.01)
*H04L 29/08* (2006.01)
(Continued)

(52) U.S. Cl.
CPC .......... *H04L 67/141* (2013.01); *G06F 3/0482* (2013.01); *H04L 12/2818* (2013.01);
(Continued)

(58) Field of Classification Search
CPC ....... H04L 43/10; H04L 45/22; H04L 67/141; G06F 15/16
(Continued)

(56) References Cited

U.S. PATENT DOCUMENTS 6,457,049 B2 * 9/2002 Lewis .................... G06Q 50/24
                                                                             705/1.1
6,996,555 B2 * 2/2006 Muto ................ H04L 29/12113
(Continued)

FOREIGN PATENT DOCUMENTS

CN           101106499          1/2008
CN           101315727        12/2008

OTHER PUBLICATIONS

European Search Report dated Dec. 2, 2015 issued in counterpart application No. 12836432.0, 10 pages.
(Continued)

*Primary Examiner* — Tesfay Yohannes
(74) *Attorney, Agent, or Firm* — The Farrell Law Firm, P.C.

(57) ABSTRACT

Methods and apparatus are provided for communication connection service. Identification information of a second device is acquired. An inquiry about whether to register the second device as a favorite device is displayed. A registration request message is sent to a server, when a request to register the second device as the favorite device is inputted in response to the inquiry. The registration request message includes the identification information of the second device. A registration response message is received from the server in response to the registration request message. A user interface of the first device is controlled to provide feedback informing of a success or a failure in registering the second device as the favorite device based on the registration response message.

10 Claims, 15 Drawing Sheets

(51) Int. Cl.
*H04L 12/28* (2006.01)
*H04W 4/20* (2018.01)
*G06F 3/0482* (2013.01)
*H04L 12/24* (2006.01)
*H04L 29/06* (2006.01)
*H04W 4/00* (2018.01)

(52) U.S. Cl.
CPC .......... *H04L 12/2825* (2013.01); *H04L 41/22* (2013.01); *H04L 63/102* (2013.01); *H04L 67/10* (2013.01); *H04W 4/203* (2013.01); *H04L 67/025* (2013.01); *H04W 4/001* (2013.01)

(58) Field of Classification Search
USPC .................................. 709/201, 206; 370/338
See application file for complete search history.

(56) References Cited

U.S. PATENT DOCUMENTS

| | | | |
|---|---|---|---|
| 7,308,087 B2* | 12/2007 | Joyce | G06Q 20/00 379/114.01 |
| 7,669,218 B1* | 2/2010 | Groff | H04N 5/44513 713/168 |
| 7,802,065 B1* | 9/2010 | Eatough | G06F 12/0813 711/130 |
| 7,987,138 B2* | 7/2011 | Patterson | G06Q 10/06 705/35 |
| 8,052,045 B1* | 11/2011 | Warren | G07F 7/04 235/375 |
| 8,743,130 B2* | 6/2014 | Mahajan | G06T 11/60 345/502 |
| 8,806,033 B1* | 8/2014 | Vinapamula Venkata | H04L 45/302 709/228 |
| 9,380,442 B2* | 6/2016 | Turtinen | H04W 8/005 |
| 9,479,548 B2* | 10/2016 | Jensen | G06Q 10/101 |
| 9,479,549 B2* | 10/2016 | Pearson | H04L 65/403 |
| 2002/0152395 A1 | 10/2002 | Zhang | |
| 2002/0167684 A1* | 11/2002 | Kikuchi | H04N 1/00241 358/1.15 |
| 2003/0041195 A1 | 2/2003 | Isoda | |
| 2004/0049524 A1 | 3/2004 | Toyota | |
| 2004/0054747 A1 | 3/2004 | Breh et al. | |
| 2005/0210464 A1 | 9/2005 | Machida | |
| 2006/0031459 A1 | 2/2006 | Ahn et al. | |
| 2006/0106933 A1 | 5/2006 | Huang et al. | |
| 2007/0050050 A1* | 3/2007 | Tanida | G05B 19/0426 700/2 |
| 2007/0199076 A1* | 8/2007 | Rensin | H04L 29/06027 726/27 |
| 2008/0010374 A1 | 1/2008 | Lim et al. | |
| 2008/0189411 A1 | 8/2008 | Motoyama | |
| 2009/0037578 A1 | 2/2009 | Hattori | |
| 2009/0089353 A1* | 4/2009 | Fukuta | G06F 15/16 709/201 |
| 2009/0150562 A1 | 6/2009 | Kim et al. | |
| 2010/0235261 A1* | 9/2010 | Lloyd | G06F 8/61 705/26.1 |
| 2010/0319061 A1 | 12/2010 | Hatakeyama | |
| 2011/0007901 A1 | 1/2011 | Ikeda et al. | |
| 2011/0106279 A1 | 5/2011 | Cho et al. | |
| 2011/0115816 A1* | 5/2011 | Brackney | G06Q 10/06 345/629 |
| 2011/0125910 A1 | 5/2011 | Sueda | |
| 2011/0159884 A1* | 6/2011 | Chawla | H04W 52/0254 455/456.1 |
| 2011/0167105 A1* | 7/2011 | Ramakrishnan | G06Q 10/10 709/203 |
| 2011/0231542 A1 | 9/2011 | Komano et al. | |
| 2011/0242598 A1* | 10/2011 | Ohara | G06F 3/1205 358/1.15 |
| 2012/0020345 A1* | 1/2012 | Zhou | H04L 12/14 370/338 |
| 2012/0023077 A1 | 1/2012 | Kann | |
| 2012/0051350 A1* | 3/2012 | Kim | H04W 76/023 370/338 |
| 2012/0220326 A1 | 8/2012 | Li | |
| 2013/0046690 A1* | 2/2013 | Calman | G06Q 40/02 705/44 |
| 2013/0301481 A1 | 11/2013 | Inoue | |
| 2013/0340059 A1* | 12/2013 | Christopher | H04W 12/04 726/7 |
| 2015/0112923 A1* | 4/2015 | Driesen | G06F 17/30377 707/609 |
| 2015/0193439 A1* | 7/2015 | Gaur | G06F 17/3033 707/747 |

OTHER PUBLICATIONS

Chinese Office Action dated Aug. 3, 2016 issued in counterpart application No. 201280048290.6, 21 pages.
Chinese Office Action dated Aug. 14, 2017 issued in counterpart application No. 201280048290.6, 18 pages.
European Search Report dated Apr. 19, 2017 issued in counterpart application No. 12836432.0-1853, 8 pages.

* cited by examiner

METHOD AND APPARATUS FOR COMMUNICATION CONNECTION SERVICE

PRIORITY

This application is a continuation of U.S. patent application Ser. No. 13/603,982, which was filed in the U.S. Patent and Trademark Office on Sep. 5, 2012, and claims priority under 35 U.S.C. § 119(a) to a Korean Patent Application filed on Sep. 29, 2011 in the Korean Intellectual Property Office and assigned Serial No. 10-2011-0098792, the entire disclosure of which is incorporated herein by reference.

BACKGROUND OF THE INVENTION

1. Field of the Invention

The present invention relates generally to a communication connection service between devices and, more particularly, to a method and apparatus for conveniently providing a communication connection service between devices based on server support.

2. Description of the Related Art

A home network is an assembly of one or more technologies that enable user convenience through the control, management, integration and interoperability of household information appliances. In such a home network system, home network middleware corresponds to an interface between a sub-network layer and an application layer. Various technologies for the home network include, for example, Universal Plug and Play (UPnP), Jini, Open Service Gateway Initiative (OSGi), and Home Audio/Video Interoperability (HAVi). Additionally, wired/wireless technologies for connections between the devices include, for example, Bluetooth, Wi-Fi direct, and Digital Living Network Alliance (DLNA).

Home network related services have been provided through connections of wired/wireless devices based on a single home gateway. However, with the exception of a download service on the Internet, most services are at a home automation level and are serviced within a limited area. Further, even though communication connection technology between devices acts as a generic technology and provides useful services to the user, media sharing is available only at the same access point or within a short distance due to spatial limitations.

SUMMARY OF THE INVENTION

The present invention has been made to address at least the above problems and/or disadvantages and to provide at least the advantages described below.

One aspect of the present invention provides a method and apparatus for a communication connection service, providing convenient access to or management of a favorite device.

Another aspect of the present invention provides a method and apparatus for a communication connection service between devices, allowing remote access of a first device to a designated second device.

According to one aspect of the present invention, a method is provided for communication connection service of a first device. The method includes acquiring identification information of a second device, displaying an inquiry about whether to register the second device, sending a registration request message to a server, when a request to register the second device is inputted in response to the inquiry, where the registration request message comprises the identification information of the second device, and controlling a user interface of the first device to provide feedback informing of a success or a failure in registering the second device.

According to another aspect of the present invention, a method is provided for communication connection service of a first device. The method includes receiving information about a second device registered in a server from the server, displaying a list of one or more devices, which includes the second device, on a screen, using the information about the second device, sending identification information about a designated second device to the server, when the second device is designated from among the list of the one or more devices, and performing access to the designated second device, based on support from the server.

According to still another aspect of the present invention, a method is provided for communication connection service of a server. An authorization request message is received from a first device. The method includes receiving an authorization request message from a first device, where the authorization request message comprises user account information, performing authorization for access by the first device using the user account information, when the authorization succeeds and a request for registering a second device is received from the first device, updating registered device information of a user using information about the second device in the request received from the first device, and sending an update result of the registered device information to the first device.

According to yet another aspect of the present invention, a method is provided for communication connection service of a server. The method includes monitoring a connection status of a user with at least one second device registered in a server, sending a second device information response message to a first device of the user, where the second device information response message comprises the connection status and identification information about each of the at least one second device registered in the server, receiving identification information about a designated one of the at least one second device registered in the server, from the first device, and creating a session for a connection between the first device and the designated second device in response to the received identification information about the designated second device.

According to further another aspect of the present invention, a communication connection service apparatus is provided. The apparatus includes a control unit configured to acquire identification information of a second device, a user interface configured to display an inquiry about whether to register the second device, and a communication unit configured to send a registration request message to a server, when a request to register the second device is inputted in response to the inquiry, where the registration request message comprises the identification information of the second device, and where the control unit is further configured to control the user interface to provide feedback informing of a success or a failure in registering the second device.

According to still another aspect of the present invention, a communication connection service apparatus of a first device is provided. The apparatus includes a communication unit configured to receive information about a second device registered in a server from the server, and to send identification information about a designated second device to the server, when the second device is designated from among the list of the one or more devices, a user interface configured to display the list of the one or more devices, which includes the second device, on a screen, using the information about the second device, and a control unit configured to perform access to the designated second device, based on support from the server.

According to yet another aspect of the present invention, a communication connection service apparatus of a server is provided. The apparatus includes a communication unit configured to receive an authorization request message from a first device, where the authorization request message comprises user account information, and a control unit configured to perform authorization for access by the first device using the user account information, and when the authorization succeeds and a request for registering a second device is received from the first device, to update registered device information of a user using information about the second device in the request received from the first device, where the communication unit is further configured to send an update result of the registered device information to the first device.

According to still another aspect of the present invention, a communication connection service apparatus of a server is provided. The apparatus includes a control unit configured to monitor a connection status of a user with at least one second device registered in a server, and a communication unit configured to send a second device information response message to a first device of the user, where the second device information response message comprises the connection status and identification information about each of the at least one second device registered in the server, and to receive identification information about a designated one of the at least one second device registered in the server from the first device, and where the control unit is further configured to create a session for a connection between the first device and the designated second device in response to the received identification information about the designated second device.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF EMBODIMENTS OF THE PRESENT INVENTION

Figure 1:
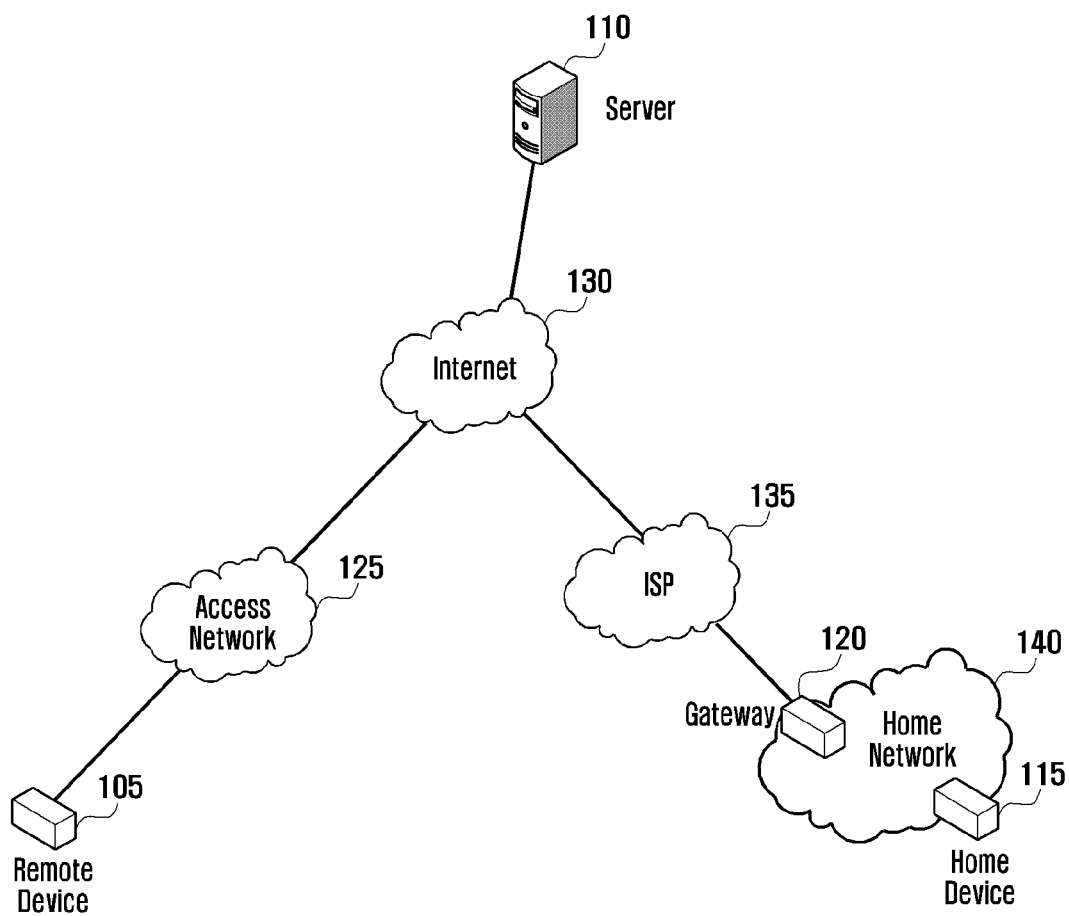
FIG. 1 is a schematic diagram illustrating a communication system, in accordance with an embodiment of the present invention.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

A device having or using a communication connection service apparatus may be embodied as any kind of electronic device such as, for example, a smart phone, a television, a computer, a cellular phone, a kiosk, a printer, a scanner, an e-book or a multimedia player. The device may also be embodied as any kind of equipment capable of interconnecting with a computer or communication device, any kind of control device, or any kind of remote controller. Also, a communication connection service apparatus may be used in any type of device that is capable of providing various services by means of temporary or continuous communication, and may not be limited to any specific form.

Additionally, protocols used in communication between devices, or between a device and a server, are not limited to a specific system or a specific standard, and may be applied to various communication systems or standards. Therefore, a communication connection service apparatus of a device may use or control a modulation/demodulation scheme having various signal forms.

A server that includes or employs a communication connection service apparatus, according to an embodiment of the present invention, may be embodied as a network entity capable of accessing the Internet or a public network. For example, the communication connection service apparatus of the server may be used in equipment, base stations, base station controllers, routers, switches, hubs, Internet line sharers, gateways, access points, or set-top boxes, which interact with a computer and a communication device.

Embodiments of the present invention describe a way of providing a new service realized using communication connections between devices located inside and outside a private network (or small sized network), such as, for example, an office or home network.

For example, devices located in the home network may provide DLNA related services, based on a wired/wireless local area network. The devices may also provide new DLNA related services, based on a communication connection between a device located inside the home network and a device located outside the home network. Although new services may also be provided based on other standards, DLNA is used as an example herein. DLNA related services include services performed based on DLNA standards by a communication connection service apparatus, such as a home network device, a mobile portable device, or a home infra device. For example, DLNA related services include functions such as a digital media server, a digital media player, a digital media renderer, a digital media controller, a digital media printer, a digital media uploader, a digital media downloader, a network connection function, and media interoperability. DLNA related services provide new functions and/or services proposed in embodiments of the present invention, as well as functions based on conventional standards. DLNA related services described herein use, at least in part, terms, concepts or functions based on, or modified from, DLNA standards.

FIG. 1 is a diagram illustrating a communication system, in accordance with an embodiment of the present invention.

A home network 140 is an example of a private network or a small-scale network. In the home network 140, devices 115 and 120 transmit and receive data and/or multimedia based on a wired/wireless communication technique, such as, for example, wired/wireless Local Area Network (LAN), Wi-Fi, or Bluetooth. If a remote device 105 belongs to the home network 140 together with a home device 115, the devices 105, 115 and 120 may support a DLNA related service.

A device may be located inside or outside the home network 140. The device 115 located inside the home network 140 is a home device, and the device 105 located outside the home network 140 is a remote device. The device 120 may be embodied as a gateway. The remote device 105 accesses the home device 115, through the support of a server 110. The user may move the remote device 105 inside or outside the home network 140. The remote device 105 will also be referred to herein as a first device, and the home device 115 will also be referred to herein as a second device.

The server 110 can access the Internet (or a public network) 130. An access network 125 supports access of the first device 105 to the Internet (or public network) 130. The access network 125 includes an Internet Service Provider (ISP) 135, a base station for providing 3rd Generation (3G) or 4th Generation (4G) communication services, a controller, a router, and a gateway. Although the server 110 is depicted as being separately connected to the Internet (or public network) 130, the server 110 may be alternatively included in the access network 125, the ISP 135, or the home network 140. Furthermore, the server 110 may be integrated with or connected to the gateway 120 or the second device 115 in the home network 140.

The server 110 supports remote access of the first device 105 to the second device 115. The server 110 manages the second device 115 as a favorite device, or monitors a connection status of the second device 115. The server 110 has information about the second device 115 in order to manage the second device 115 as a favorite device. At least part of the information may be provided to the server 110 by the second device 115. Also, if the first and second devices 105 and 115 are located in the home network 140, at least part of the information about the second device 115 may be provided to the server 110 by the first device 105. A user of the first device 105 may directly input at least part of the information about the second device 115.

Figure 2:
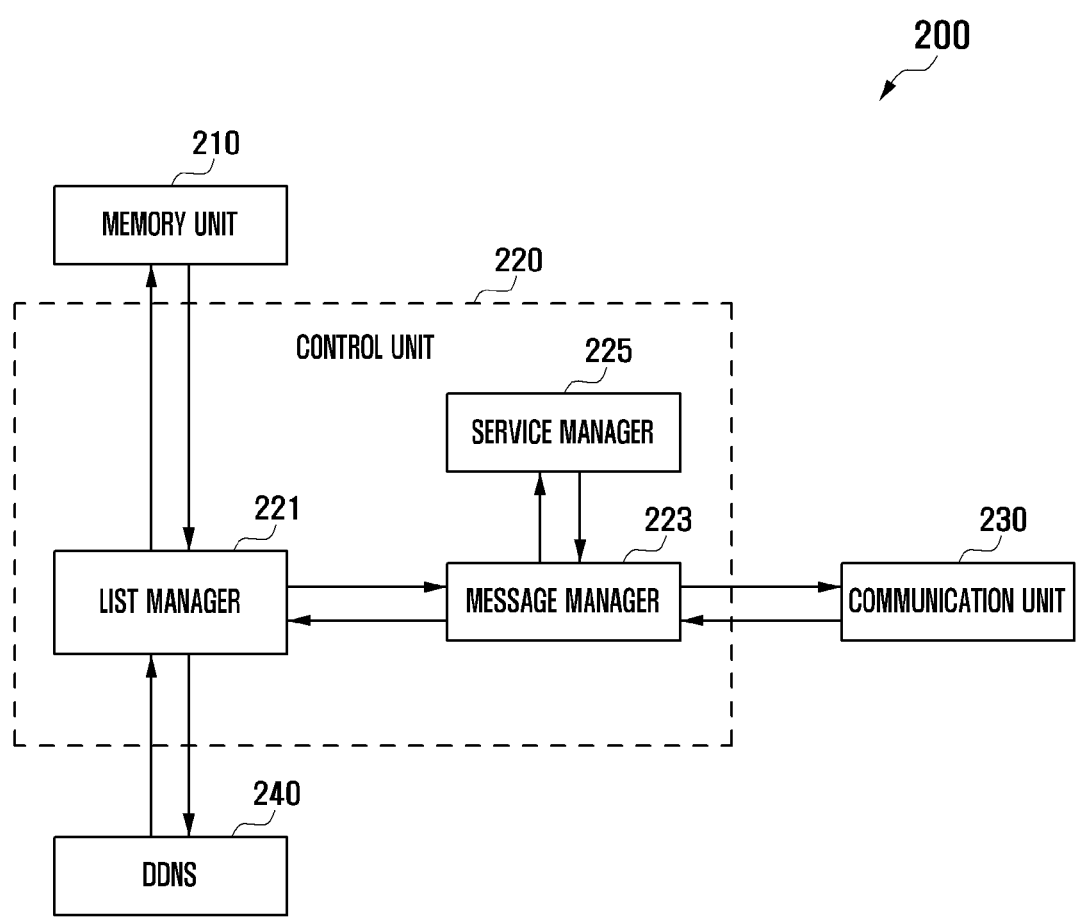
FIG. 2 is a block diagram illustrating a communication connection service apparatus of a server, in accordance with an embodiment of the present invention.

FIG. 2 is a block diagram illustrating a communication connection service apparatus of a server, in accordance with an embodiment of the present invention.

A communication connection service apparatus 200 of the server includes a communication unit 230 and a control unit 220. Specifically, the communication unit 230 receives an authorization request message containing user account information, from the first device. The control unit 220 authorizes the access of the first device by using the user account information. If authorization succeeds, and if the first device requests the registration of the second device as a favorite device, the control unit 220 updates existing information about the user's favorite device by using information about the second device received from the first device. The communication unit 230 sends update results about favorite device information to the first device.

The communication connection service apparatus 200 of the server also includes a memory unit 210 that maintains information about the user's favorite device. Favorite device information includes at least one of an Internet Protocol (IP) address, a port number, a Media Access Control (MAC) address, a device name, a unique device number, a service type, device authorization information, a connection status, and a connection mode, regarding to the second device.

The control unit 220 monitors a connection status of at least one user's favorite device. The communication unit 230 sends, to the first device, a favorite device information response message that contains identification information and a connection status about each of at least one favorite device. Additionally, the communication unit 230 receives, from the first device, identification information about a favorite device designated from at least one favorite device. In response to the identification information about a designated favorite device, the control unit 220 creates a session for a connection between the first device and the designated favorite device.

The control unit 220 creates a session by controlling transmission of a connection request message to the designated favorite device, by controlling reception of a connection response message in response to the connection request message from the designated favorite device, and by controlling transmission of information about success or failure of the connection to the first device in response to the connection response message.

A user's favorite device information, which is maintained in the memory unit 210, includes information for accessing at least one favorite device when the first device and at least one favorite device are not located in the same local area network. Favorite device information contains at least one of identification information and a connection status.

The communication unit 230 encodes data (or a message) received from a message manager 223 in the control unit 220, create a modulated signal by modulating the encoded data according to a specific communication connection mode with the device, and transmit the modulated signal to the device in a wired or wireless manner according to a specific communication connection medium with the device. Additionally, the communication unit 230 receives a signal from the device, demodulates the received signal, decodes the demodulated signal, and thereby acquires decoded data (or a message). For example, the communication unit 230 receives an authorization request message, a registration request message, a favorite device information request message, information about a designated favorite device, a connection response message, or a service request message, from the device. Also, the communication unit 230 sends an authorization response message, a registration response message, a favorite device information response message, a connection result message, or a connection request message to the device. In FIG. 1, a communication connection mode with the device includes at least one of a mode of connecting to the Internet 130 and a mode of connecting to the home network 140 when the server 110 is located in the home network 140. If different modes of communication connection with the device are available, components of a communication interface may be modified or added depending on the mode. The communication unit 230 may include an encoder, a decoder, a modulator, a demodulator, and/or a Radio Frequency (RF) circuit.

The memory unit 210 stores user account information and/or authorization information. Also, the memory unit 210 maintains a user's favorite device information. A favorite device may be a specific device that corresponds to favorite device information stored in the memory unit 210. This favorite device information has identification information and/or a connection status. The identification information includes at least one of a MAC address, a device name, a unique device number, and a service type. The connection status includes at least one of a network connection or disconnection and a network connection quality. Also, the favorite device information further includes an IP address, a port number, a connection mode, or device authorization information. Tables 1 and 2 show favorite device information stored in the memory unit 210. In Tables 1 and 2, each row indicates information about a favorite device.

TABLE 1

| Name | MAC | Current IP | Authorization |
|---|---|---|---|
| IpTime | XX-XX-XX.. | XXX.XXX.XX.. | ID: XXXX PW: XXXX |
| Office.. | XX-XX-XX.. | XXX.XXX.XX.. | Void |
| Myw.. | XX-XX-XX.. | Not connected | Void |
| AP3 | XX-XX-XX.. | Not connected | ID: XXXX PW: XXXX |
| ... | ... | ... | ... |

TABLE 2

| Name | MAC | Type | Authorization | Status |
|---|---|---|---|---|
| [HHP] MyPhone | XX-XX-XX-XX-XX.. | Wi-Fi direct | PW: XXXX | ON |
| [Tablet] GalaxyTab | XX-XX-XX-XX-XX.. | DLNA | Void | ON |
| [TV] LEDUNBP.. | XX-XX-XX-XX-XX.. | DLNA | Void | OFF |
| [PC].. | XX-XX-XX-XX-XX.. | Wi-Fi direct | PW: XXXX | OFF |
| ... | ... | ... | ... | ... |

According to an embodiment of the present invention, favorite devices may be classified into Access Point (AP) and non-AP devices. Favorite device information corresponding to an AP and favorite device information corresponding to a non-AP device may have data tables with different structures. For example, Table 1 may indicate favorite device information corresponding to an AP, and Table 2 may indicate favorite device information corresponding to a non-AP device. Even though there is no request to register an AP as a favorite device, information (e.g., Table 1) about the AP may be included in favorite device information when a device designated as a favorite device is connected to a server through the AP. If there is a request for the registration of an AP, information (e.g., Table 2) about any devices to which the AP, designated as a favorite device, provides a service may be included in the favorite device information.

The AP may be embodied as a wired or wireless Internet router, a gateway, a switch, a hub, or a set-top box. Device authorization information may be security information required to access a device designated as a favorite device. Also, device authorization information may include an IDentifier (ID) and a PassWord (PW). An authorization process may be not required in some devices based on the functionality of devices or a user's setting. Device authorization information shown in Tables 1 and 2 may be omitted from favorite device information for such devices. Table 2 indicates a service type or a communication connection mode serviced to a designated device. If the first device 105 of FIG. 1 acquires information about the second device 115 after a connection with the second device 115, and then sends a registration request message containing such information about the second device 115, the service type may be a communication connection mode between the first and second devices 105 and 115. The communication connection mode may include, for example, wired/wireless LAN, DLNA, Wi-Fi, Wi-Fi direct, or Bluetooth. A status shown in FIG. 2 may indicate a connection status, which may include a network connection or disconnection, represented by ON or OFF, and a network connection quality. The network connection quality may be detected as the quality of the connection between a server and a designated device, the quality of the connection between devices, or the quality of the connection to a local area network at a designated device. The memory unit 210 may be embodied in various memory forms, such as, for example, a volatile or nonvolatile memory, or a hard disk.

The control unit 220 includes a list manager 221, the message manager 223, and a service manager 225.

The message manager 223 acquires information by analyzing received data (or a message), and send the analyzed information to the list manager 221 and the service manager 225. The message manager 223 creates data (or a message) to be sent to a device. The message manager 223 acquires at least part of the information to be contained in the data from the list manager 221 and/or the service manager 225, or by accessing the memory unit 210. If an authorization request message is received from a device, the message manager 223 receives a user account from the list manager 221 or from the memory unit 210, compares the received user account with user account information contained in the authorization request message, and creates information about authorization success or failure. The message manager 223 then creates an authorization response message containing such information about authorization success or failure, and sends the authorization response message to the communication unit 230. If a registration request message containing device information is received, the message manager 223 sends the received device information to the list manager 221. Also, the message manager 223 receives update results of favorite device information from the list manager 221 and then creates a registration response message containing the received update results.

If a favorite device information request message is received from a device, the message manager 223 receives at least part of the favorite device information from the list manager 221 and then creates a favorite device information response message containing the received favorite device information. If information about a designated favorite device is received from a device, the message manager 223 creates a connection request message to be sent to the designated favorite device. If a connection response message is received from a designated favorite device, the message manager 223 creates a connection result message to be sent to the device from which the information about a designated favorite device is received.

The service manager 225 manages communication connection service processes. If a connection request message containing information about a designated favorite device (e.g., the second device 115) is received from the first device 105, as shown in FIG. 1, the service manager 225 controls the message manage 223 to create a connection request message to be sent to the second device 115. If a connection response message received from the second device 115 contains information about approval for access to the first device 105, the service manager 225 creates a session for providing a communication connection service between the first and second devices 105 and 115. In order to allow DLNA related services between devices after an IP layer is connected between the first and second devices 105 and 115, the service manager 225 controls a format or transmission/reception process of data (or a message) created in the message manager 223, based on a modification in at least part of a software module or a communication protocol at the upper layer of the IP layer. If a communication mode required for a connection with a designated device or with a device sending a service request message is different from a communication mode required for a communication connection service between devices, the service manager 225 includes modules adequate for respective communication modes. For example, if a service request message is received from a device after the creation of a session for providing a communication connection service between devices, the service manager 225 controls relaying of the service request message to a designated device. Also, the service manager 225 controls traffic on data or a message transmission/reception between devices.

The list manager 221 updates or manages favorite device information stored in the memory unit 210. For example, if the second device 115 of FIG. 1 is registered as a favorite device, the list manager 221 updates an IP address of the second device 115 stored in the memory unit 210 by using a Dynamic Domain Name Server (DDNS) 240. Additionally, the list manager 221 controls the message manager 223 and/or the communication unit 230 to monitor a connection status of the second device 115 by using identification information and/or an IP address of a favorite device. Also, the list manager 221 manages account information and/or authorization information about the user corresponding to favorite device information.

The communication connection service apparatus 200 of the server further includes the DDNS 240. For example, since an address of device located in a private network, such as the home network 140 of FIG. 1, can be dynamically assigned, the DDNS 240 identifies a current address by tracking an IP address of AP (e.g., the gateway 120) for connecting a favorite or designated device. If the gateway 120 supports a DDNS function and allows access to the second device 115 by using domain and port number, the DDNS 240 may be removed from the communication connection service apparatus 200 or the function of the DDNS 240 may cease.

As will be understood by those skilled in the art, the above discussed elements or configurations in the communication connection service apparatus 200 of the server may be varied in part or combined in various manners.

Figure 3:
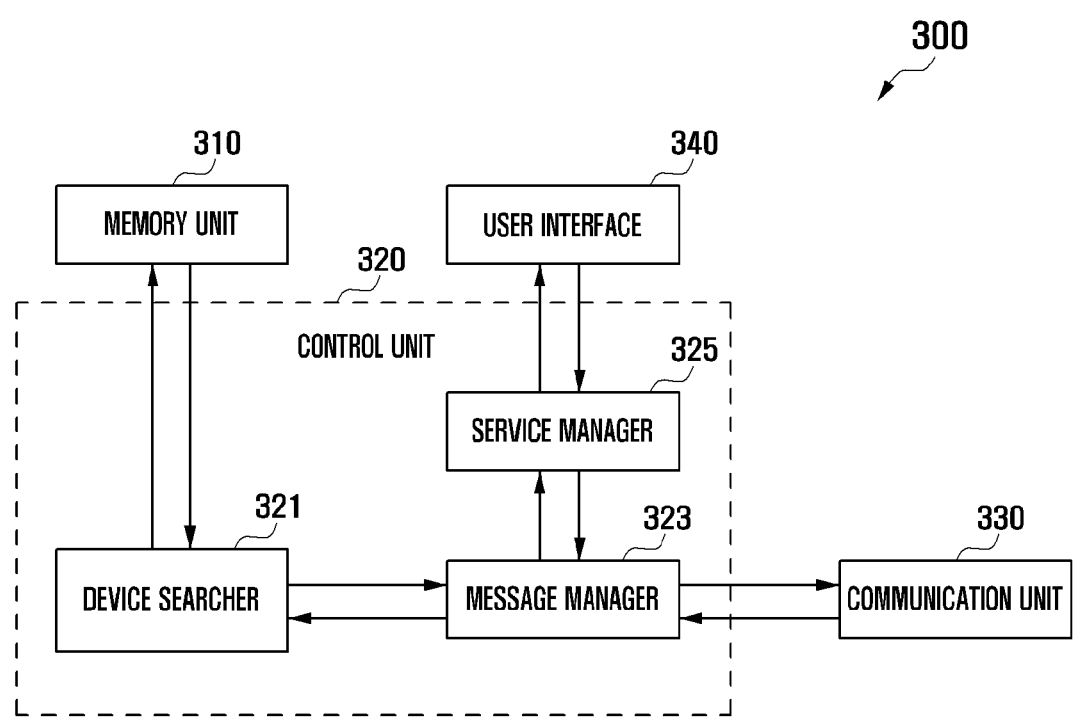
FIG. 3 is a block diagram illustrating a communication connection service apparatus of a device, in accordance with an embodiment of the present invention.

FIG. 3 is a block diagram illustrating a communication connection service apparatus of a device, in accordance with an embodiment of the present invention. The device corresponds to the first device 105 or the second device 115, shown in FIG. 1.

A communication connection service apparatus 300 of the device includes a control unit 320, a user interface 340, and a communication unit 330.

The control unit 320 acquires identification information about the second device. The user interface 340 displays, on a screen, an inquiry as to whether to register the second device as a favorite device. When there is an input of a request to register the second device as a favorite device in response to the inquiry, the communication unit 330 transmits a registration request message containing identification information about the second device to a server. The communication unit 330 then receives a registration response message from the server in response to the registration request message. Depending on the received registration response message, the control unit 320 controls the user interface 340 to selectively provide feedback that informs of a success in registering the second device as a favorite device. A favorite device refers to a device that corresponds to favorite device information stored in the memory unit of the server. If the first device and a favorite device are not located in the same local area network, favorite device information may be information about access of the first device to a favorite device.

The communication device 330 receives information about a favorite device registered in the server from the server, and transmits identification information about a designated favorite device to the server when a favorite device is designated among at least one device contained in a list. Using information about a favorite device, the user interface 340 displays the list of at least one device including a favorite device on the screen. The control unit 320 controls the access to the designated favorite device, based on a support of the device. The control unit 320 controls the reception of a connection result message, from the server, containing information about a success or failure in connecting with the designated favorite device. In case of a successful connection, the control unit 320 controls remote access to the designated favorite device via the server. Information about a favorite device includes identification information and a connection status.

The communication unit 330 encodes data (or a message) received from a message manager 323 in the control unit 320, create a modulated signal by modulating the encoded data according to a specific communication connection mode with the server or other device, and transmit the modulated signal to the device or other device in a wired or wireless manner according to a specific communication connection medium. Additionally, the communication unit 330 receives a signal from the server or other device, demodulate the received signal, decode the demodulated signal, and thereby acquire decoded data (or a message). For example, the communication unit 330 transmits an authorization request message, a registration request message, a favorite device information request message, information about a designated favorite device, a connection response message, or a service request message. Also, the communication unit 330 receives an authorization response message, a registration response message, a favorite device information response message, a connection result message, or a connection request message, from the server or other device. A communication connection mode with the server or other device includes at least one of a mode of connecting to the Internet and a mode of connecting to a local area network when the server or other device is located in the local area network. If different modes of communication connection with the server or other device are available, components of a communication interface may be modified or added depending on the mode. The communication unit 330 includes an encoder, a decoder, a modulator, a demodulator, and/or an RF circuit.

The communication connection service apparatus 300 of the device further includes a memory unit 310 that may be embodied in various memory forms, such as, for example, a volatile or nonvolatile memory, or a hard disk.

The control unit 320 includes a device searcher 321, the message manager 323, and a service manager 325.

The device searcher 321 controls a connection with a device located in the same local area network or with any neighboring device, or controls a search for neighboring devices. The device searcher 321 controls the message manager 323 and/or the communication unit 330 to search devices. The device searcher 321 controls information (e.g., information about a searched device) received through the message manager 323, and/or the communication unit 330, to be stored in the memory unit 310. Information stored in the memory unit 310 includes at least part of favorite device information. For example, information stored in the memory unit 310 includes identification information and/or an IP address as information about a searched device.

The message manager 323 creates data (or a message) to be sent to the server or other device, and acquires at least part of the information to be included in the data by receiving it from the device searcher 321 and/or from the service manager 325, or by accessing the memory unit 310. Also, the message manager 323 acquires information by analyzing the received data (or message), and sends the analyzed information to the memory 310 and/or the service manager 325. For example, the message manager 323 receives user account information (or authorization information) from the user interface 340 or the memory unit 310, and creates an authorization request message containing user account information. Additionally, the message manager 323 receives information (e.g., identification information and/or an IP address) about a designated device from the device searcher 311 or the memory unit 310, and creates a registration request message containing information about a designated device. If a registration response message is received from the server, the message manager 323 analyzes the registration response message and then sends information about registration success or failure as a favorite device contained in the registration response message, to the service manager 325. If a favorite device information response message is received from the server, the message manager 323 sends information about a favorite device contained in the favorite device information response message to the memory unit 310 or the service manager 325. Using information about a designated favorite device received from the user interface 340, the service manager 325, or the memory unit 310, the message manager 323 constructs a message according to a predefined format and then sends the message to the communication unit 330. If a connection result message is received from the server, the message manager 323 analyzes the connection result message and then transmits information about success or failure in connecting with a designated favorite device to the service manager 325.

If a connection request message is received from the server, the message manager 323 sends authorization information about a counterpart device contained in the connection request message to the service manager 325. After receiving connection response information about whether to allow access by the counterpart device, from the service manager 325 or the user interface 340, the message manager 323 constructs a connection response message.

The service manager 325 manages communication connection service processes. The service manager 325 also controls a format or transmission/reception process of data (or a message) created in the message manager 323. The service manager 325 further sends, to the user interface 340, information or data to be fed back to the user, and controls the user interface 340. The service manager 325 receives information from the user interface 340. For example, the service manager 325 controls the user interface 340 to display an inquiry about whether to register a searched device as a favorite device. When information about registration success or failure as a favorite device is received from the message manager 323, the service manager 325 controls the user interface 340 to selectively provide feedback informing of the registration success or failure. Also, when information about a favorite device is received, the service manager 325 controls a list for at least one device including a favorite device to be displayed on the screen. Using a service-related protocol or a software module, the service manager 325 creates a session for providing a communication connection service (e.g., DLNA), or control data transmission/reception.

The user interface 340 provides feedback of data or information to the user and receives a user input. Specifically, the user interface 340 provides a visible, audible or tangible feedback to the user and receives a touch, key, voice or motion input from the user. Also, the user interface 340 may include a touch screen, which may have a combination of a display module and a touch sensor. The display module may include a Cathode Ray Tube (CRT), a Liquid Crystal Display (LCD), a Plasma Display Panel (PDP), a Light Emitting Diode (LED), a Light Emitting Polymer (LEP) display, or Organic Light Emitting Diodes (OLEDs). The touch sensor may be disposed on the front side, the rear side, or at the same level of the display module. The touch sensor may use, for example, a capacitive technique, a resistive technique, an infrared technique, or a surface acoustic wave technique.

As will be understood by those skilled in the art, the above described elements or configurations in the communication connection service apparatus 300 of the device may be varied in part or combined in various manners.

Processes for signal flows between devices are described with reference to FIGS. 4 and 5. A first device 410 and a second device 420, shown in FIGS. 4 and 5, may have or correspond to the communication connection service apparatus 300 of FIG. 3. Also, a server 430, shown in FIGS. 4 and 5, may have or correspond to the communication connection service apparatus 200 of FIG. 2.

Figure 4:
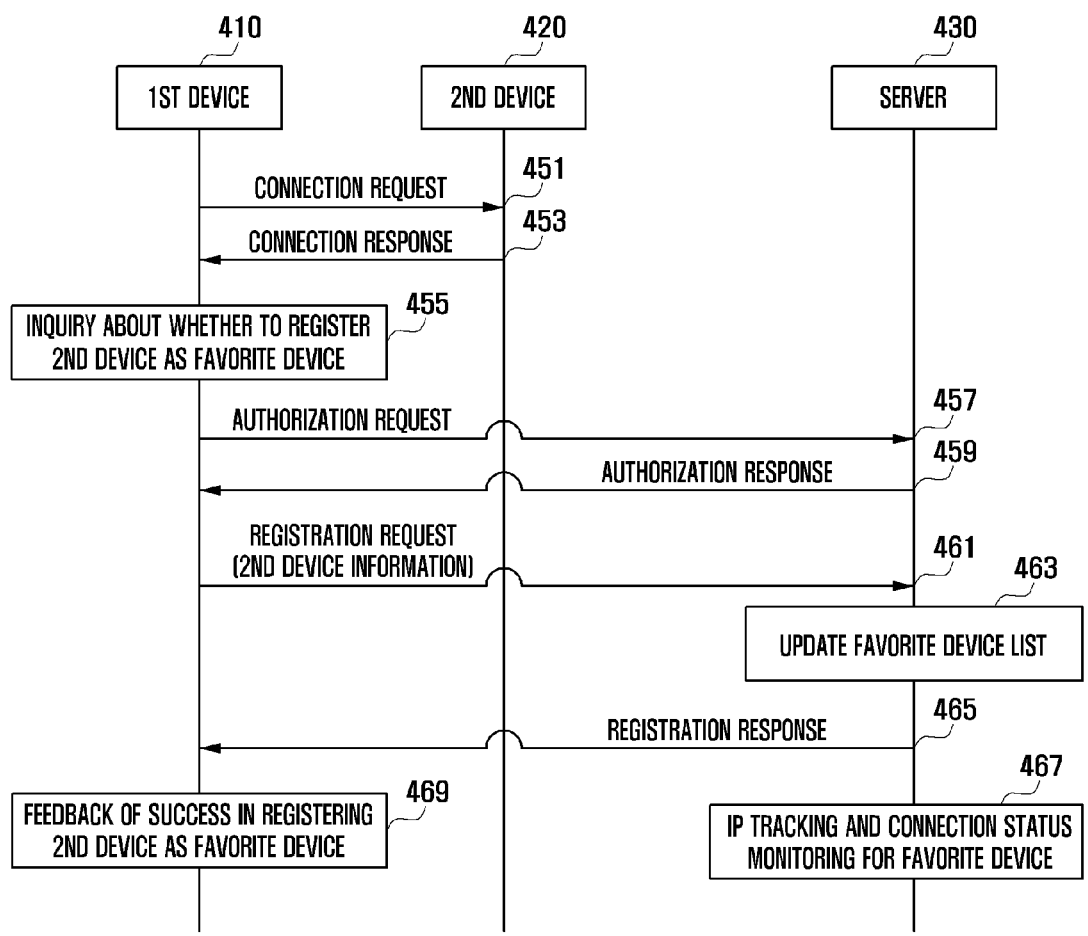
FIG. 4 is a diagram illustrating a signal flow process between devices, in accordance with an embodiment of the present invention.

FIG. 4 relates to an embodiment of the present invention in which the first device 410 transmits at least part of information about the second device 420 to the server 430, when the first and second devices 410 and 420 are located in the same LAN. In FIG. 4, any AP may be located between the server 430 and the LAN containing the first and second devices 410 and 420, thereby performing a function to relay signals between the local area network and the server 430. Alternatively, the first and second devices 410 and 420 may be integrated with an AP.

In step 451, the first device 410 sends a connection request message to the second device 420. In step 453, the first device 410 receives a connection response message from the second device 420. Step 451 and step 453 may be at least part of a communication connection process of the first and second devices 410 and 420, or a process in which the first device 410 searches for the second device 420 and receives information about the second device 420. For example, step 451 and step 453 may be a process of transmitting and receiving UPnP standard discovery and/or device description (including identification information) for a DLNA service connection. The connection response message may contain a device description of the second device 420. In step 451 and step 453, the first device 410 acquires identification information about the second device 420.

In step 455, the first device 410 displays an inquiry, on a screen, about whether to register the second device 420 as a favorite device. In step 457, the first device 410 sends an authorization request message to the server 430. In step 459, the first device 410 receives an authorization response message from the server 430. Steps 457 and 459 may be performed before/after any step between step 451 and step 455, or alternatively, may be omitted. When a request for registering the second device 420 as a favorite device is inputted as reply to the inquiry of step 455, the first device 410 sends a registration request message containing identification information about the second device 420 to the server 430, in step 461. In step 465, the first device 410 receives a registration response message as reply to the registration request message, from the server 430. The authorization request message of step 457 and the registration request message of step 461 may be integrated into a single message. Therefore, the response messages of the server 430 in steps 459 and 465 may also be integrated into a single message. This integrated message may contain user account information and identification information about the second device. In step 469, the first device 410 controls a user interface to selectively provide feedback informing of a success in registering the second device 420 as a favorite device, depending on the received registration response message.

In step 457, the server 430 receives the authorization request message containing user account information from the first device 410. Using the received user account information, the server 430 authorizes the access of the first device 410. If an authorization succeeds, and if a request for registering the second device 420 as a favorite device is received from the first device 410 in step 461, the server 430 updates favorite device information by using information about the second device 420 received from the first device 410, in step 463. In step 465, the server 430 sends an update result of favorite device information to the first device 410. In step 467, the server 430 tracks an IP of a favorite device by using the DDNS, or the server 430 monitors a connection status of a favorite device.

Figure 5:
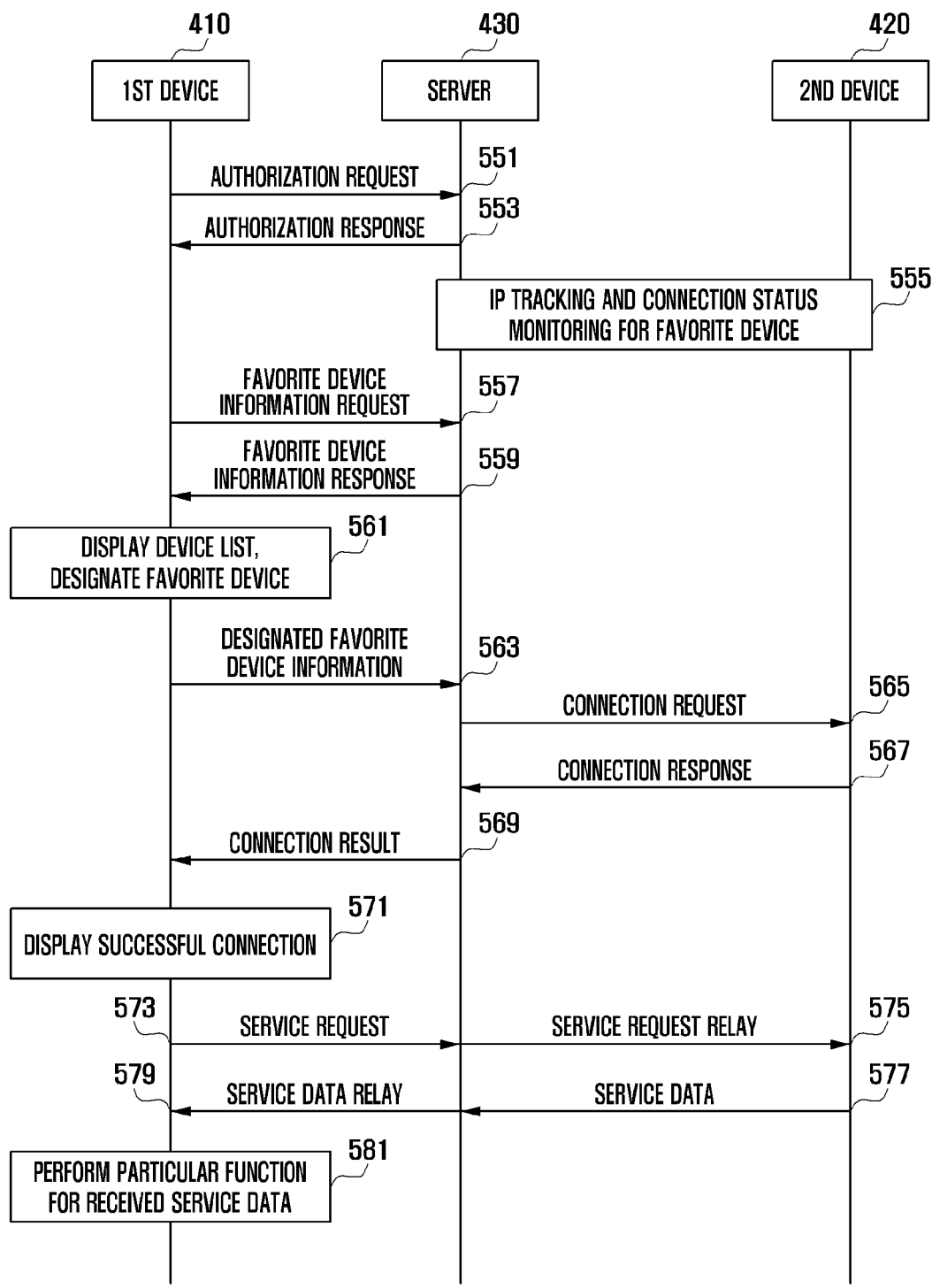
FIG. 5 is a diagram illustrating a signal flow process between devices, in accordance with another embodiment of the present invention.

FIG. 5 illustrates a process of a communication connection service between the first and second devices 410 and 420, when the second device 420 is located inside the local area network and the first device 410 is located outside the local area network. In FIG. 5, any AP may be located between the server 430 and the local area network containing the second device 420, thereby performing a function that relays signals between the local area network and the server 430. Alternatively, the second device 420 may be integrated with the AP.

In step 551, the first device 410 sends an authorization request message to the sever 430. In step 553, the first device 410 receives an authorization response message from the server 430. In step 557, the first device 410 sends a favorite device information request message to the server 430. In step 559, the first device 410 receives information about a favorite device registered in the server 430 from the server 430. The authorization request message in step 551 and the favorite device information request message in step 557 may be integrated into a single message. Therefore, the response messages of the server 430 in steps 553 and 559 may also be integrated into a single message.

In step 561, by using information about a favorite device, the first device 410 displays a list of at least one device including a favorite device on a screen. When a favorite device is designated from among the at least one device contained in the list, the first device 410 sends identification information about a designated favorite device to the server 430, in step 563. A designated favorite device may be the second device 420. In step 569 to step 573, the first device 410 accesses the designated favorite device 420, based on support from the server 430. For example, in step 569, the first device 410 may receive, from the server 430, a connection result message containing information about success or failure in connecting with the designated favorite device 420. In step 571, depending on the received information, the first device 410 controls a user interface to provide feedback for informing success or failure in connection. When connection with the designated favorite device 420 is successful, the first device 410 remotely accesses the designated favorite device 420 via the server 430, in step 573. For example, the first device 410 sends a service request message to the server 430, in step 573, and the server 430 relays the service request message to the designated favorite device 420, in step 575. The designated favorite device 420 sends service data to the server 430, in step 577, and the server 430 relays the service data to the first device 410, in step 579. In step 581, the first device 410 performs a particular function for the received service data. For example, the first device 410 performs a music-related or image-related application by using the received data.

In step 555, the server 430 monitors a connection status of at least one favorite device. This monitoring operation may correspond with step 557, regardless of the timing. Also, step 555 may be repeatedly performed at regular intervals. In step 559, the server 430 sends, to the first device 410, a favorite device information response message containing identification information and a connection status about each of at least one favorite device. In step 563, the server 430 receives, from the first device 410, identification information about the designated favorite device 420 among at least one favorite device. In response to the reception of identification information about the designated favorite device 420, the server 430 creates a session for a connection between the first device 410 and the designated favorite device 420. For example, in step 565, the server 430 sends a connection request message to the designated favorite device 420. The connection request message may have device authorization information contained in the favorite device information. In response to the connection request message, the server 430 receives a connection response message from the designated favorite device 420, in step 567. Also, according to an authorization request of the designated favorite device 420, the server 430 may insert device authorization information contained in the favorite device information into a separate message, and then send it to the designated favorite device 420. In step 569, the server 430 may send information about connection success or failure to the first device 410 based on the received connection response message.

A communication connection service method is described below, with reference to FIGS. 6 to 10, according to embodiments of the present invention.

Figure 6:
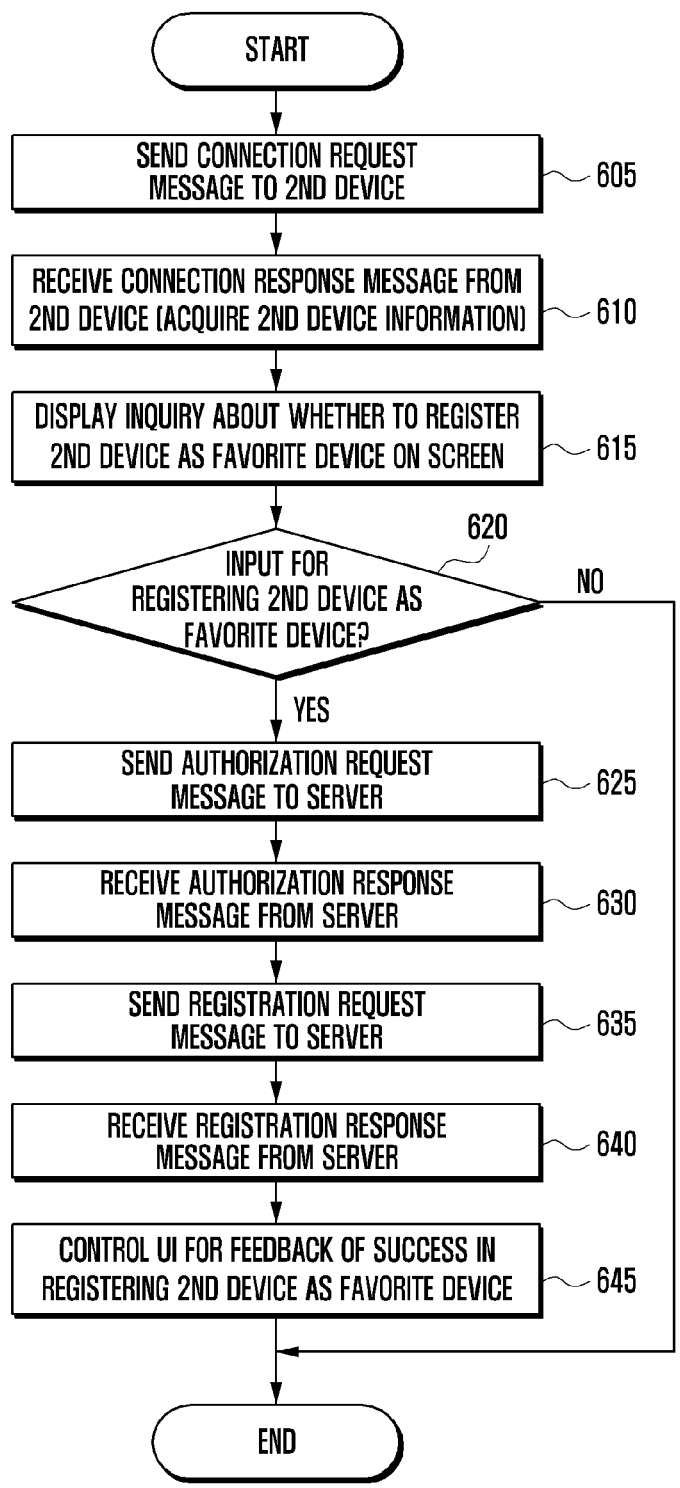
FIG. 6 is a flow diagram illustrating a communication connection service method of a first device, in accordance with an embodiment of the present invention.

Although FIG. 6 illustrates flow diagram that corresponds to the operation of the first device 410 of FIG. 4, various modifications, such as an integration of messages and/or steps, an omission of some messages, or a change of a process order may be possible.

In step 605, the first device 410 sends a connection request message to the second device 420. Step 605 may be a process in which the first device 410 requests the description of the second device 420 to be used in a search for the second device 420. The first device 410 may also search other local devices contained in the local area network. Such a local device in the local area network may include a specific AP for servicing the first device 410, any neighboring AP unrelated to a service for the first device 410, or any devices serviced by such a neighboring AP.

In step 610, the first device 410 receives a connection response message from the second device 420. The connection response message may contain the description (including identification information) of the second device 420. The first device 410 may acquire identification information about the second device 420 through steps 605 and 610.

Figure 11:
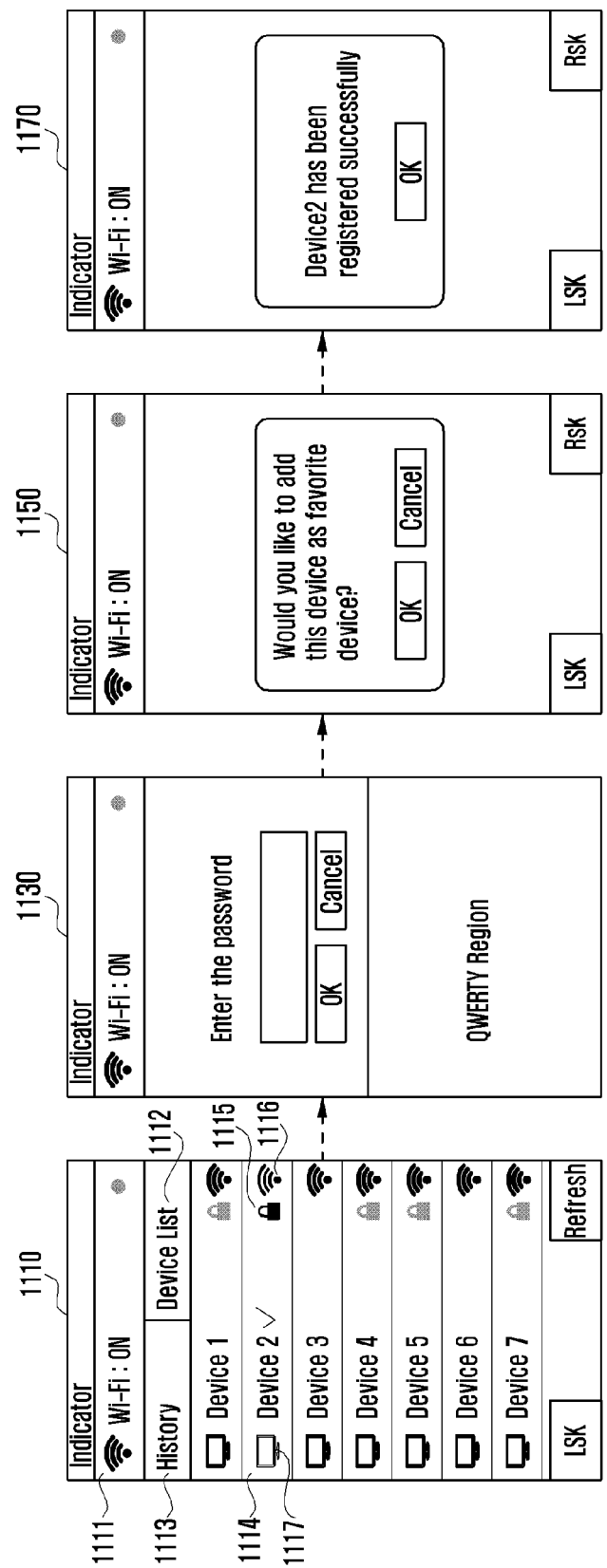
FIG. 11 illustrates a screen displayed in a first device, in accordance with an embodiment of the present invention.

In step 615, the first device 410 displays an inquiry, on a screen, about whether to register the second device 420 as a favorite device. For example, as shown in FIG. 11, a list 1112 of local devices searched by the first device 410 may be displayed on a screen 1110 of the first device 410. In the list 1112, only network-connected devices may be arranged, or presently disconnected devices having a connected history may also be arranged. The screen 1110 displays network-connected devices in the list 1112, and when a history cell 1113 is selected, displays presently disconnected devices having a connected history. A second cell 1111 indicates a communication mode (e.g., Wi-Fi) used for a search by the first device 410. Device information displayed on the screen 1110 includes a device name, a service type 1117, which may be represented as text or an icon (e.g., an icon 1117 represents a renderer), a security status 1115, and a connection status 1116.

Figure 12:
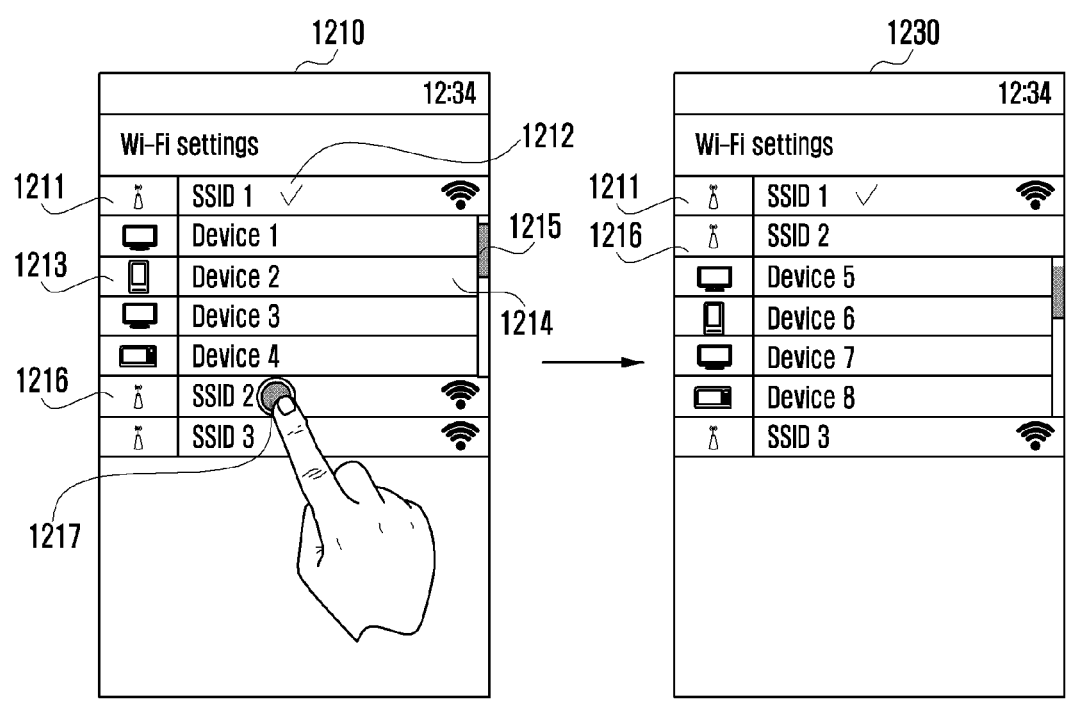
FIG. 12 further illustrates a screen displayed in a first device, in accordance with an embodiment of the present invention.

Screens 1210 and 1230 shown in FIG. 12 show another example of the above-discussed screen 1110 in FIG. 11. A cell 1211 indicates that a specific AP (e.g., Service Set IDentifier (SSID) 1) is designated to service the first device 410. Devices serviced by the designated AP, SSID 1, include Device 1 to Device 4. If the number of these devices exceeds a given number, a scroll bar 1215 may be used to show non-displayed devices on the screen 1210. Device information contained in the list includes an icon 1213 indicating a service type or device type, and a device name 1214. The list on the screen 1210 may further have neighboring APs (e.g., SSID 2 and SSID 3). If the user desires to register a device serviced by any neighboring AP (e.g., SSID 2 in a cell 1216) as a favorite device, a desired AP (SSID 2) is designated in the first device 410 through a selection 1217 by the user. If the AP of SSID 2 is designated on the screen 1210 of the first device 410, an extended list of devices serviced by the AP of SSID 2 is displayed on the next screen 1230 of the first device 410. At the same time, a list of devices serviced by the AP of the SSID 1 is reduced or disappears from the screen 1230.

Returning to FIG. 11, a cell 1114 indicates that Device 2 is designated from among the searched devices through the user's selection. A next screen 1130 shows a user interface for receiving device authorization information required for connection with the designated Device 2. After device authorization information is received on the screen 1130, a next screen 1150 of the first device 410 displays an inquiry about whether to register the designated Device 2 as a favorite device. This screen 1150 may be automatically displayed when Device 2 is designated, or selectively displayed through a menu.

Returning now to FIG. 6, in step 620, the first device 410 determines whether there is input for registering the second device 420 as a favorite device. If there is no input, the first device 410 terminates the methodology.

When there is an input for registering the second device 420 as a favorite device, the first device 410 sends an authorization request message containing user account information to the server 430, in step 625.

In step 630, the first device 410 receives an authorization response message containing information about authorization success or failure from the server 430. Herein, it is supposed that the authorization response message contains information about authorization success.

In step 635, the first device 410 sends a registration request message containing identification information about the second device 420 to the server 430.

In step 640, the first device 410 receives a registration response message containing information about registration success or failure with the second device as a favorite device, from the server 430.

In step 645, the first device 410 controls a user interface to selectively provide feedback informing of a success in registering the second device 420 as a favorite device. For example, if the registration response message contains information about success in registering the second device as a favorite device, the first device 410 displays information about a successful registration on a screen 1170 as shown in FIG. 11.

Figure 7:
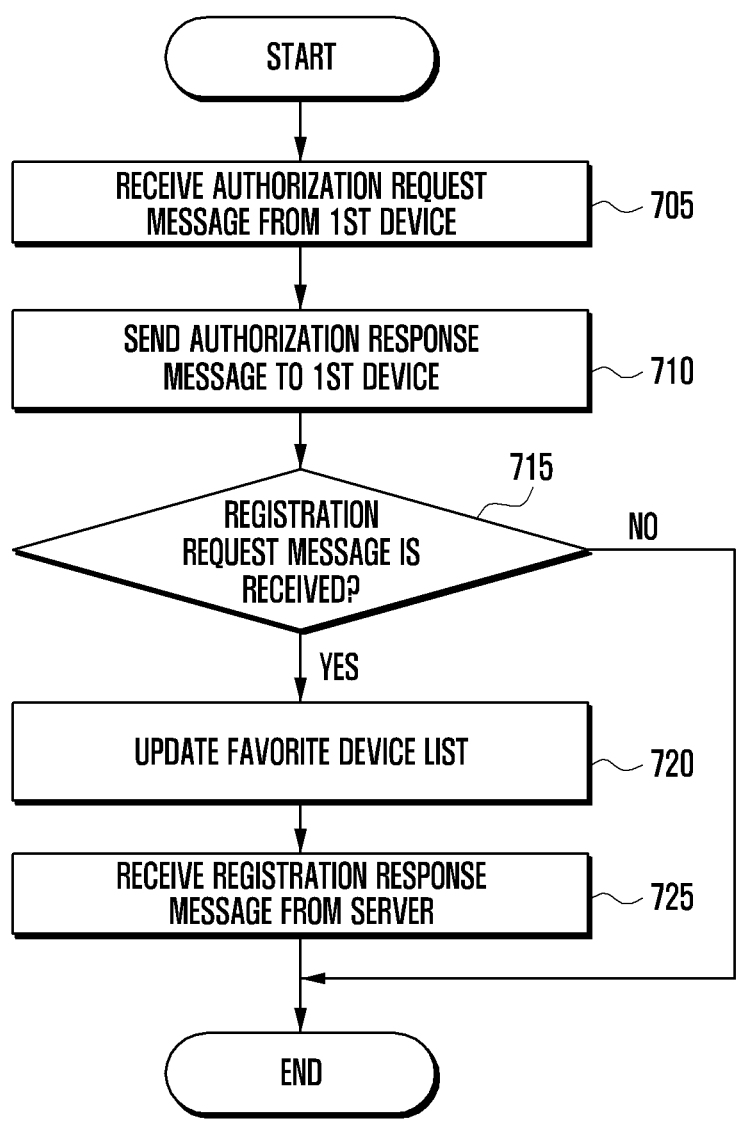
FIG. 7 is a flow diagram illustrating a communication connection service method of a server, in accordance with an embodiment of the present invention.

Although FIG. 7 illustrates a flow diagram that corresponds to the operation of the server 430 of FIG. 4, various modifications, such as an integration of messages and/or steps, an omission of some messages, or a change of a process order, may be possible.

In step 705, the server 430 receives an authorization request message containing user account information from the first device 410.

In step 710, the server 430 sends an authorization response message containing information about authorization success or failure to the first device 410. Herein, it is supposed that the authorization response message contains information about authorization success.

In step 715, the server 430 determines whether a registration request message is received from the first device 410 (namely, whether there is a request for registering the second device 420 as a favorite device). If no registration request message is received, the server 430 terminates the methodology. Here, a favorite device may refer to a device that corresponds to favorite device information stored in the memory unit of the server 430. If the first device 410 and a favorite device are not located in the same local area network, favorite device information may be information about accessing a favorite device by the first device 410.

If the registration request message is received from the first device 410 (namely, there is a request for registering the second device 420 as a favorite device), the server 430 updates, in step 720, favorite device information (or a favorite device list) by using information about the second device 420 received from the first device 410. Information about the second device 420 may include identification information about the second device 420 acquired by the first device 410 through a communication between the first and second devices 410 and 420 located in the same LAN. Additionally, the registration request message and/or the registration response message may be delivered through the Internet to and from the first device 410 located in the LAN. If the second device 420 is not registered as a favorite device, favorite device information may be updated by adding information about the second device 420 thereto. If the second device 420 has already been registered as a favorite device, favorite device information may be updated by replacing previous information about the second device 420 contained therein with new information about the second device 420. If the second device 420 has already been registered as a favorite device, and if previous information about the second device 420 contained in favorite device information is the same as received information about the second device 420, favorite device information may be updated by maintaining previous information.

The server 430 may maintain favorite device information in the memory unit. Favorite device information may include at least one of an IP address, a port number, a MAC address, a device name, a device unique number, a service type, device authorization information, a connection status, and a connection mode, all of which relate to the second device 420. Also, favorite device information corresponding to the AP and favorite device information corresponding to the non-AP device may have data tables with different structures In step 725, the server 430 sends a registration response message containing information about registration success or failure with the second device 420 as a favorite device (namely, containing an update result of favorite device information) to the first device 410. This update result may include one of success and failure in registering the second device 420 as a favorite device.

Figure 8:
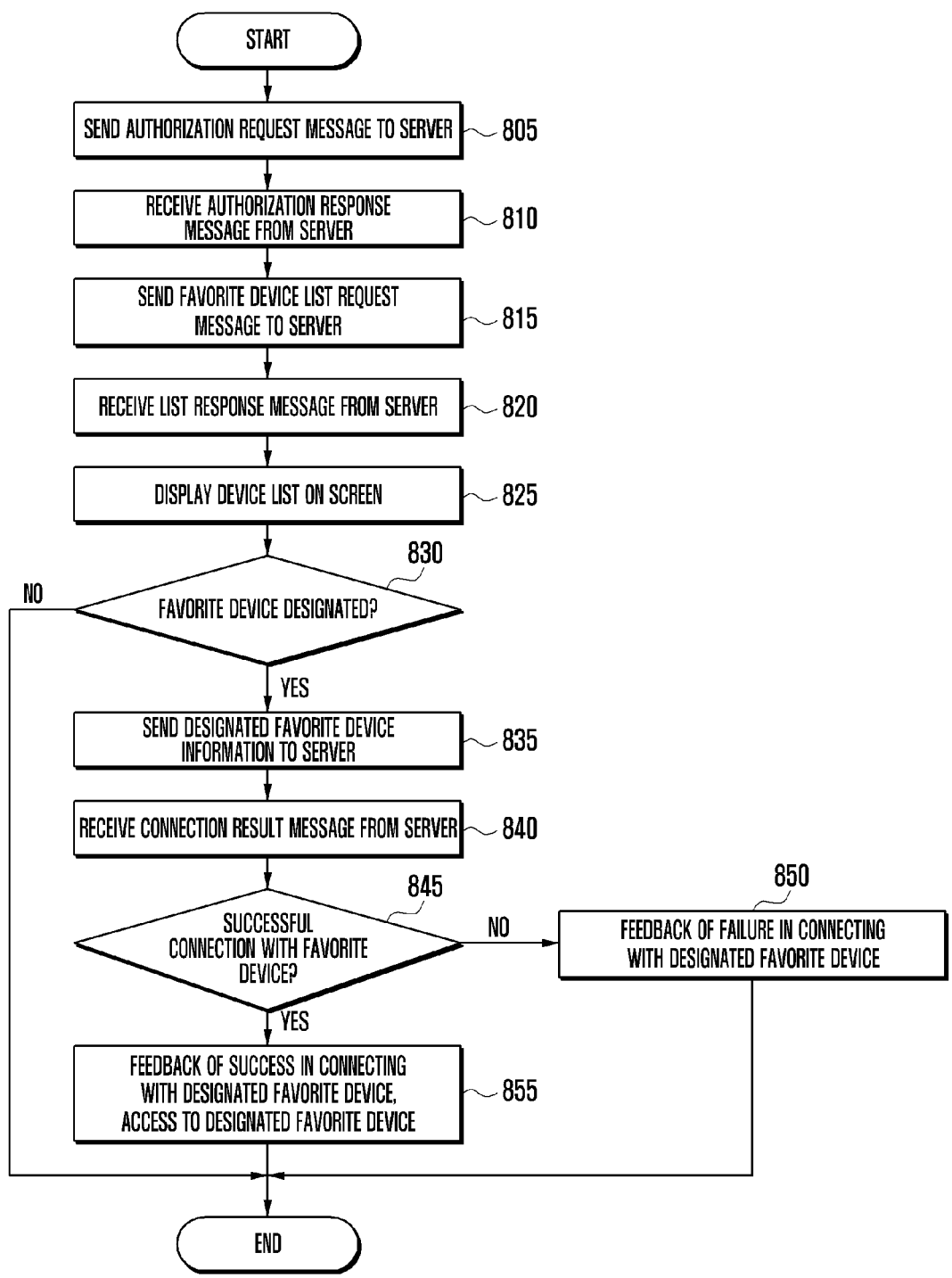
FIG. 8 is a flow diagram illustrating a communication connection service method of a first device, in accordance with another embodiment of the present invention.

FIG. 8 illustrates a flow diagram that corresponds to the operation of the first device 410 of FIG. 5. Alternatively, various modifications, such as an integration of messages and/or steps, an omission of some messages, or a change of a process order, may be possible.

In step 805, the first device 410 sends an authorization request message containing user account information to the server 430.

In step 810, the first device 410 receives an authorization response message containing information about authorization success or failure from the server 430.

In step 815, the first device 410 sends a favorite device list request message to the server 430.

In step 820, the first device 410 receives a list response message containing information about a favorite device registered in the server 430 from the server 430. Information about a favorite device may include identification information having at least one of a MAC address, a device name, a unique device number, and a service type. The information may also include a connection status, having at least one of a network connection or disconnection, and a network connection quality.

Figure 13:
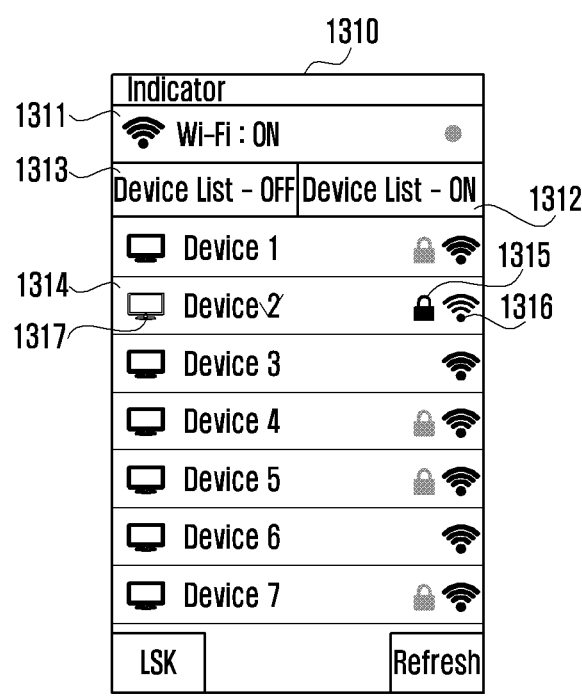
FIG. 13 is illustrates a screen displayed in a first device, in accordance with another embodiment of the present invention.

In step 825, the first device 410 displays, on a screen, a list of at least one device having a favorite device using received information about the favorite device. The list displayed on the screen may contain a favorite device and at least one local device searched in a local area network where the first device 410 is located. For example, a screen 1310 of the first device 410, shown in FIG. 13, displays a list of devices with a network-connected status 1312. If another tab 1313 is selected, devices with a network-disconnected status may be displayed. Device information shown in the list on the screen 1310 includes a device name, a service type 1317, a security status 1315, and a connection status 1316. A cell 1311 indicates a common communication mode (e.g., Wi-Fi) of devices arranged in the list on the screen 1310.

Figure 14:
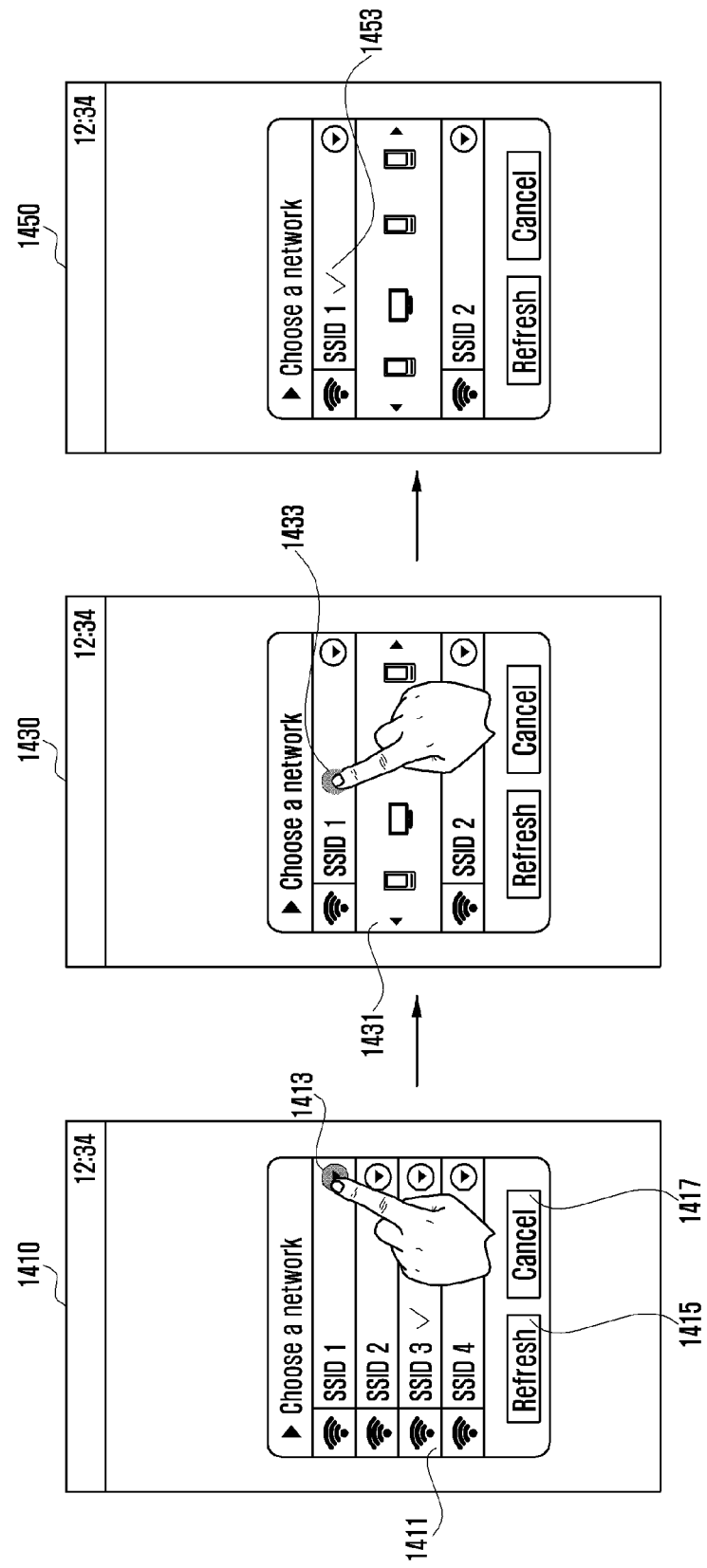
FIG. 14 further illustrates a screen displayed in a first device, in accordance with another embodiment of the present invention.
Figure 15:
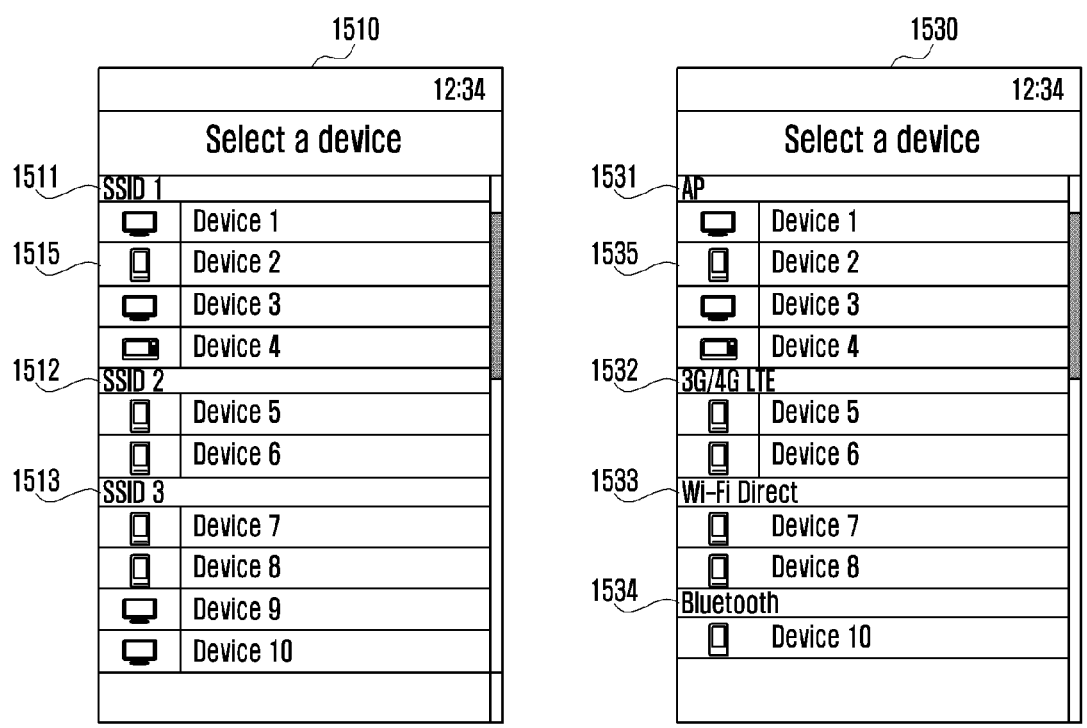
FIG. 15 further illustrates a screen displayed in a first device, in accordance with another embodiment of the present invention.

Alternatively, the list displayed on the screen 1310 of the first device 410 may be displayed in other forms, such as those shown in screens 1410, 1430 and 1450 of FIG. 14, or a screen 1510 of FIG. 15. Specifically, at least one local device contained in the list may include the first AP 1511 for servicing the first device 410, at least one device 1515 by the first AP 1511, the second and third AP 1512 and 1513 located near the first AP 1511, and at least one device serviced by the second and third AP 1512 or 1513 (e.g., Devices 5 to 10). The list displayed on the screen 1530 of the first device 410 contains a favorite device and other devices (e.g., Devices 1 to 10, including Device 1535 dependent on Wi-Fi 1531), which allow a connection and search by the first device through different communication protocols (e.g., Wi-Fi 1531, 3G/4G 1532, Wi-Fi Direct 1533, or Bluetooth 1534). The list displayed on the screen of the first device 410 may represent, in a different manner, a favorite device received from the server and a device searched in the local area network. Further, the list displayed on the screen of the first device 410 may distinguish an AP from a non-AP device.

Returning now to FIG. 8, in step 830, the first device 410 determines whether a favorite device is designated. For example, if a button 1413 for displaying or hiding devices serviced by the AP of SSID 1 is selected from a list 1411 on the screen 1410 of the first device 410, as shown in FIG. 14, devices 1431 serviced by the AP of SSID 1 are displayed in the form of icons for representing a service or device type on the screen 1430 of the first device 410. If a user interface (e.g., a touch screen) receives a selection 1433 for SSID 1 on the screen 1430, the first device 410 may recognize that the AP of SSID 1 is designated, and then display a designation 1453 for SSID 1 on the screen 1450. If a refresh button 1415 is selected on the screen 1410, the first device 410 may update a device list. If a cancel button 1417 is selected, the first device 410 may cancel a process of designating a device.

Referring back to FIG. 8, if no favorite device is designated, the first device 410 terminates the methodology.

If a favorite device is designated, the first device 410 sends information about the designated favorite device to the server, in step 835. The designated favorite device may be the second device 420.

In step 840, the first device 410 receives a connection result message containing connection result information about success or failure in connecting with the designated favorite device 420, from the server.

In step 845, the first device 410 determines whether the connection result information indicates a successful connection with the designated favorite device 420.

If the connection result information indicates an unsuccessful connection with the designated favorite device 420, the first device 410 controls a user interface to provide feedback informing of a connection failure, in step 850.

If the connection result information indicates a successful connection with the designated favorite device 420, the first device 410 controls a user interface to provide feedback informing of a connection success, in step 855. Also, the first device 410 may access the designated favorite device 420, based on support from a server 430. Namely, the first device 410 may perform remote access to the designated favorite device 420 via the server 430.

Figure 9:
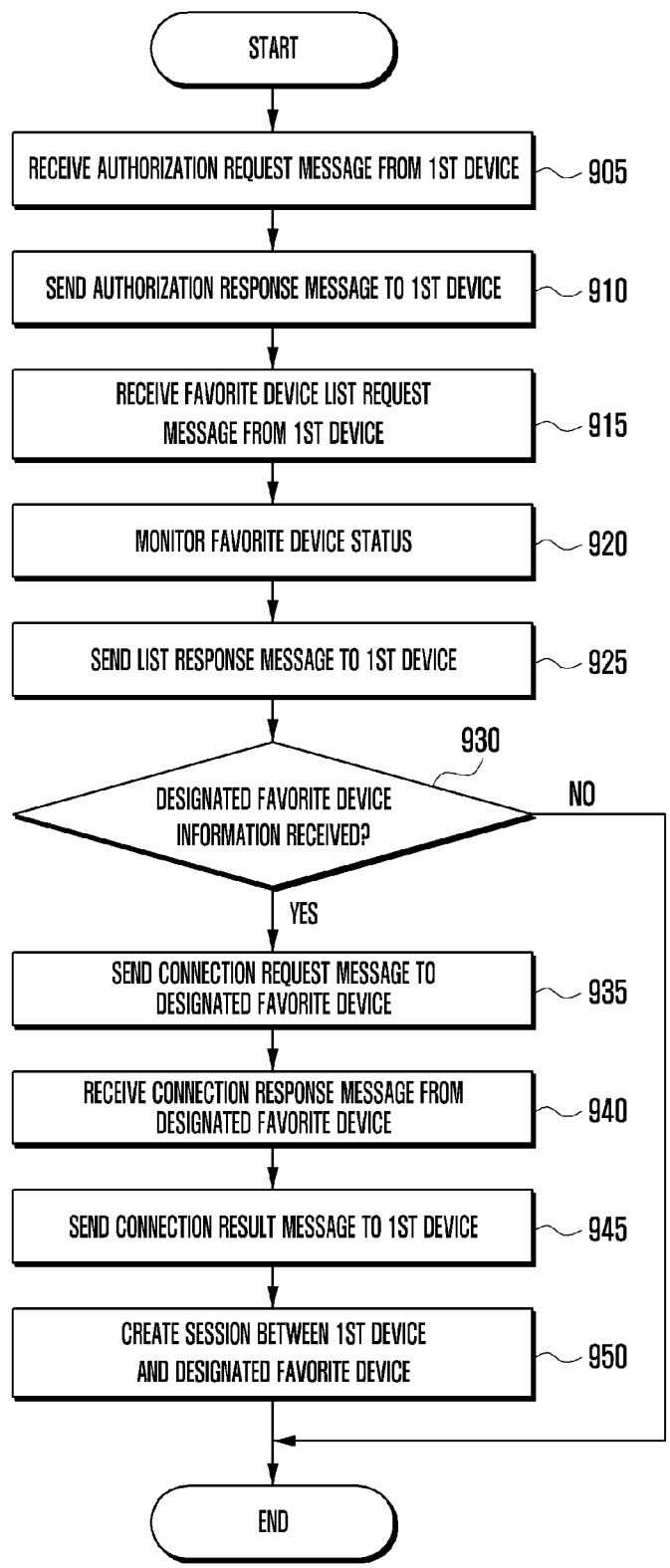
FIG. 9 is a flow diagram illustrating a communication connection service method of a server, in accordance with another embodiment of the present invention.

FIG. 9 illustrates a flow diagram that corresponds to the operation of the server 430 of FIG. 5. Alternatively, various modifications, such as an integration of messages and/or steps, an omission of some messages, or a change of a process order, may be possible.

The server 430 maintains favorite device information in the memory unit. If the first device 410 and at least one favorite device are not located in the same LAN, favorite device information may be used for access to at least one favorite device by the first device, including at least one of identification information and a connection status.

In step 905, the server 430 receives an authorization request message containing user account information from the first device 410.

In step 910, the server 430 sends an authorization response message containing information about authorization success or failure to the first device 410.

In step 915, the server 430 receives a favorite device list request message from the first device.

In step 920, the server 430 monitors a connection status of a favorite device. The connection status may include at least one of network connection or disconnection and a network connection quality. For example, the server 430 may send a status request signal to a favorite device and receive a status response signal from the favorite device. If no status response signal is received from a favorite device within a given time, or if the status response signal received from the AP that services a favorite device indicates a disconnection between a favorite device and a network, the server 430 may recognize that a favorite device is not connected with the network. If the status response signal is received from a favorite device, the server 430 may calculate a network connection quality from the status response signal.

In step 925, the server 430 sends a list response message containing information about a favorite device registered therein, to the first device 410. This information about a favorite device may include identification information and/or a connection status.

In step 930, the server 430 determines whether information about a designated favorite device is received from the first device 401. If no information about a designated favorite device is received from the first device 401, the server 430 terminates the methodology.

If information about a designated favorite device (i.e., identification information) is received from the first device 401, the server 430 sends a connection request message to the designated favorite device 420, in step 935. This connection request message may contain device authorization information.

In step 940, the server 430 receives a connection response message containing information about connection success or failure from the designated favorite device 420.

In step 945, the server 430 sends a connection result message to the first device 410 according to information about connection success or failure contained in the connection response message.

In step 950, the server 430 creates a session between the first device 410 and the designated favorite device 420.

Figure 10:
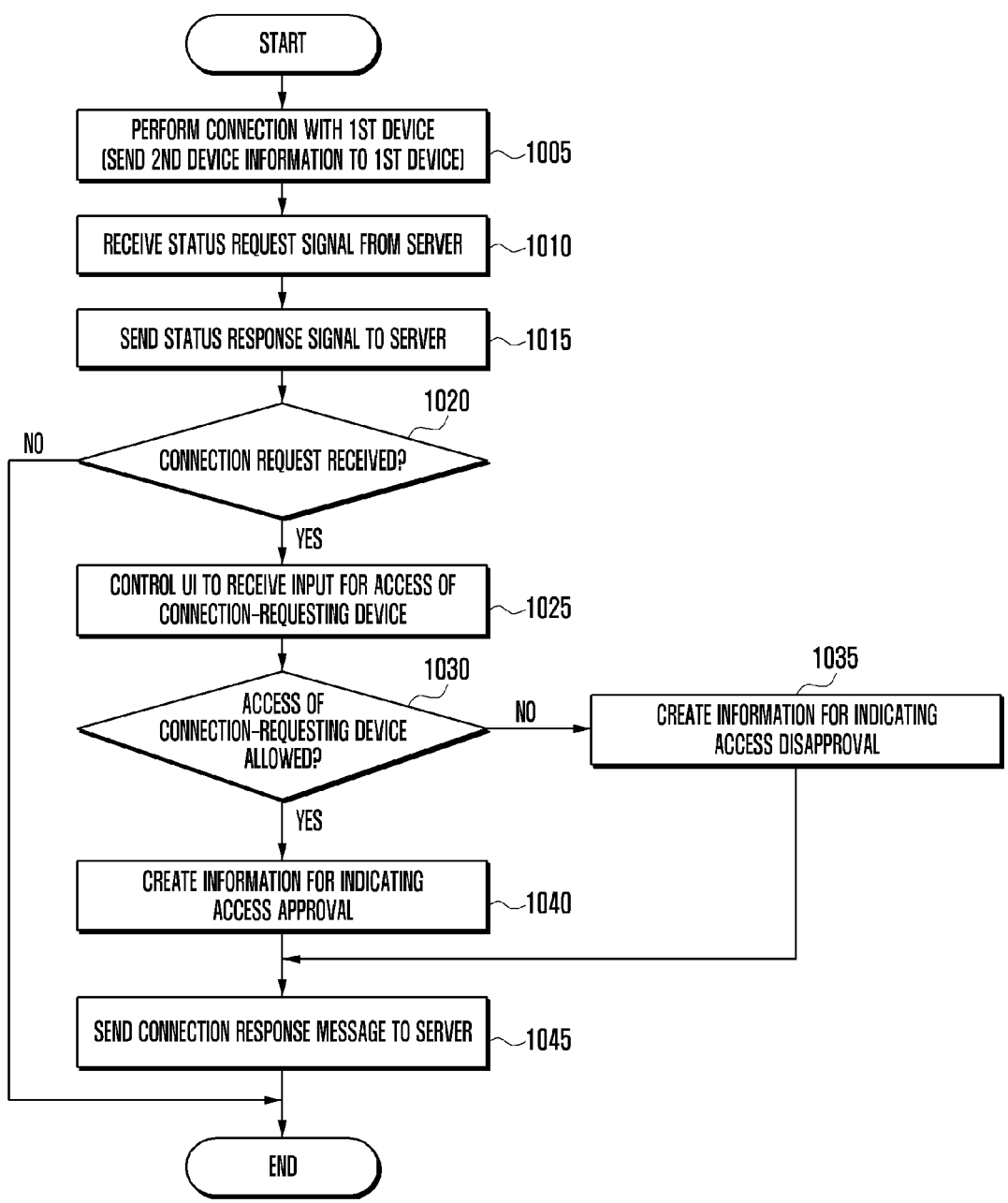
FIG. 10 is a flow diagram illustrating a communication connection service method of a second device, in accordance with an embodiment of the present invention.

Referring now to FIG. 10, step 1005 corresponds to the operation of the second device 420 of FIG. 4, and steps 1010 to 1045 correspond to the operation of the second device 420 of FIG. 5. Alternatively, various modifications, such as an integration of messages and/or steps, an omission of some messages, or a change of a process order, may be possible.

In step 1005, the second device 420 sends information about the second device 420 to the first device 410 by performing a connection with the first device 410. Also, without any request from the first device 410, the second device 420 may multicast or broadcast information about the second device 420 into the LAN.

In step 1010, the second device 420 receives a status request signal from the server 430.

In step 1015, the second device 420 sends a status response signal to the server 430. Also, even though no status request signal is received in step 1010, the second device 420 may periodically send the status response signal to the server 430. The second device 420 may send the status response signal when connected to the network or when logged off the network.

In step 1020, the second device 420 determines whether a connection request is received from the server 430. If no connection request is received from the server 430, the second device 420 terminates the methodology.

If the connection request (or a connection request message) is received from the server 430, the second device 420 controls a user interface to receive an input that allows or disallows access of the connection-requesting device 410, in step 1025. If the connection request message contains device authorization information, the second device 420 determines whether to allow access of the first device 410 from authorization success or failure.

In step 1030, the second device 420 determines whether a user interface receives an input that allows access of the connection-requesting device.

If device access is not allowed (namely, if a disallowance is received or if no input is received within a given time), the second device 420 creates information indicating an access disapproval, in step 1035.

If device access is allowed, the second device 420 creates information indicating an access approval, in step 1040.

In step 1045, the second device 420 sends a connection response message containing information created in step 1035 or step 1040, to the server 430.

Meanwhile, instead of the above-discussed control unit 320, a microprocessor or microcomputer may be used to perform operations shown in FIGS. 4 to 10. As will be understood by those skilled in the art, programs related to embodiments shown in FIGS. 4 to 10 may be constructed in software, hardware or a combination thereof, or may be downloaded from a server or computer to a UI providing device via a communication network.

Embodiments of the present invention are described herein with reference to flowchart illustrations of user interfaces, methods, and computer program products. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which are executed via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

Each block of the flowchart illustrations may represent a module, segment, or portion of code, which includes one or more executable instructions for implementing the specified logical function(s). It should also be noted that in some alternative implementations, the functions noted in the blocks may occur out of order. For example, two blocks shown in succession may in fact be executed substantially concurrently or the blocks may sometimes be executed in the reverse order, depending upon the functionality involved.

While the invention has been shown and described with reference to certain embodiments thereof, it will be understood by those skilled in the art that various changes in form and detail may be made therein without departing from the spirit and scope of the invention as defined by the appended claims.

What is claimed is:

1. A method for communication connection service of a first device, the method comprising the steps of:
    receiving information about a second device registered in a server from the server;
    displaying a list of one or more devices, which includes the second device, on a screen, using the information about the second device;
    sending identification information about a designated second device to the server, when the second device is designated from among the list of the one or more devices; and
    performing access to the designated second device, based on support from the server,
    wherein the list displayed on the screen classifies the one or more devices into an Access Point (AP) and a non-AP device.

2. The method of claim 1, wherein performing access to the designated second device comprises:
    receiving a connection result message from the server, wherein the connection result message comprises information about success or failure in connecting with the designated second device; and
    performing remote access to the designated second device via the server, when the information of the connection result message indicates a successful connection with the designated second device.

3. A method for communication connection service of a server, the method comprising the steps of:
    receiving an authorization request message from a first device, wherein the authorization request message comprises user account information;
    sending an authorization response message to the first device in response to the authorization request message;
    performing authorization for access by the first device using the user account information;
    when the authorization succeeds and a request for registering a second device is received from the first device, updating registered device information of a user using information about the second device in the request received from the first device; and
    sending an update result of the registered device information to the first device.

4. The method of claim 3, wherein the registered device is classified as an Access Point (AP) or a non-AP device, and wherein registered device information of the AP and registered device information of the non-AP device each have a respective data table with a different structure.

5. The method of claim 3, wherein the update result comprises one of success and failure in registering the second device.

6. A method for communication connection service of a server, the method comprising the steps of:
    monitoring a connection status of a user with at least one second device registered in a server;
    sending a second device information response message to a first device of the user, wherein the second device information response message comprises the connection status and identification information about each of the at least one second device registered in the server;
    receiving identification information about a designated one of the at least one second device registered in the server, from the first device; and
    creating a session for a connection between the first device and the designated second device in response to the received identification information about the designated second device.

7. A communication connection service apparatus of a first device, the apparatus comprising:
    a communication unit configured to receive information about a second device registered in a server from the server, and to send identification information about a designated second device to the server, when the second device is designated from among the list of the one or more devices;
    a user interface configured to display the list of the one or more devices, which includes the second device, on a screen, using the information about the second device; and
    a control unit configured to perform access to the designated second device, based on support from the server,
    wherein the list displayed on the screen classifies the one or more devices into an Access Point (AP) and a non-AP device.

8. The apparatus of claim 7, wherein the control unit is further configured to receive a connection result message from the server, wherein the connection result message comprises information about success or failure in connecting with the designated second device, and to perform remote access to the designated second device via the server when the information of the connection result message indicates a successful connection with the designated second device, to perform a remote access to the designated second device.

9. A communication connection service apparatus of a server, the apparatus comprising:
    a communication unit configured to receive an authorization request message from a first device, wherein the authorization request message comprises user account information, and to send an authorization response message to the first device in response to the authorization request message; and
    a control unit configured to perform authorization for access by the first device using the user account information, and when the authorization succeeds and a request for registering a second device is received from the first device, to update registered device information of a user using information about the second device in the request received from the first device,
    wherein the communication unit is further configured to send an update result of the registered device information to the first device.

10. A communication connection service apparatus of a server, the apparatus comprising:

a control unit configured to monitor a connection status of a user with at least one second device registered in a server; and a communication unit configured to send a second device information response message to a first device of the user, wherein the second device information response message comprises the connection status and identification information about each of the at least one second device registered in the server, and to receive identification information about a designated one of the at least one second device registered in the server from the first device, and wherein the control unit is further configured to create a session for a connection between the first device and the designated second device in response to the received identification information about the designated second device.

* * * * *